US 8,893,634 B2

(12) United States Patent
Harbin

(10) Patent No.: US 8,893,634 B2
(45) Date of Patent: Nov. 25, 2014

(54) SELF-POWERED SLIP PLATE TO REDUCE SKIN-FRICTION DRAG ON A MARINE VESSEL

(71) Applicant: Lawrence Harbin, Alexandria, VA (US)

(72) Inventor: Lawrence Harbin, Alexandria, VA (US)

(*) Notice: Subject to any disclaimer, the term of this patent is extended or adjusted under 35 U.S.C. 154(b) by 155 days.

(21) Appl. No.: 13/780,122

(22) Filed: Feb. 28, 2013

(65) Prior Publication Data

US 2014/0238291 A1 Aug. 28, 2014

Related U.S. Application Data

(60) Provisional application No. 61/687,577, filed on Apr. 27, 2012.

(51) Int. Cl.
*B63B 1/38* (2006.01)

(52) U.S. Cl.
CPC ........................................ *B63B 1/38* (2013.01)
USPC ............................................................ 114/67 A

(58) Field of Classification Search
USPC ........................................................ 114/67 A
IPC .......................................................... B63B 1/38
See application file for complete search history.

(56) References Cited

U.S. PATENT DOCUMENTS

| | | | | |
|---|---|---|---|---|
| 4,429,652 A * | 2/1984 | Stol | ............................. | 114/20.1 |
| 5,117,882 A * | 6/1992 | Stanford | ..................... | 114/67 A |
| 5,524,568 A * | 6/1996 | Bobst | ............................. | 114/289 |
| 5,613,456 A * | 3/1997 | Kuklinski | ..................... | 114/67 A |
| 5,895,997 A * | 4/1999 | Puskas et al. | ............. | 310/316.01 |
| 6,186,085 B1 * | 2/2001 | Kato et al. | ................... | 114/67 A |
| 6,356,816 B1 * | 3/2002 | Katz | ............................... | 701/21 |
| 6,606,959 B1 * | 8/2003 | Shen | ............................. | 114/271 |
| 6,789,491 B2 * | 9/2004 | Takahashi et al. | .......... | 114/67 A |
| 8,196,536 B1 * | 6/2012 | Harbin | ......................... | 114/67 A |
| 8,201,511 B1 * | 6/2012 | Harbin | ......................... | 114/67 A |
| 8,539,895 B2 * | 9/2013 | Harbin | ......................... | 114/67 A |
| 2002/0014192 A1 * | 2/2002 | Takahashi et al. | .......... | 114/67 A |
| 2002/0108631 A1 * | 8/2002 | Madanshetty | .................... | 134/1 |
| 2004/0016699 A1 * | 1/2004 | Bayevsky | ...................... | 210/636 |
| 2006/0061225 A1 * | 3/2006 | Beck et al. | ..................... | 310/120 |
| 2008/0276960 A1 * | 11/2008 | Holsteyns et al. | ............. | 134/1.3 |

* cited by examiner

*Primary Examiner* — Stephen Avila
(74) *Attorney, Agent, or Firm* — Harbin & Hein PLLC

(57) ABSTRACT

An anti-friction slip plate for mounting on a hull of a marine vessel to reduce skin friction drag by acoustically generating microcavitation bubbles at a wetted area of the hull. The slip plate comprises a plate-like enclosure, an energy extraction mechanism to extract power from water current flowing along the hull when underway, a power generator driven by the energy extraction mechanism to produce electrical power, an acoustic signal generator powered by the power generator to produce an acoustic signal, and a series of transducers excited by the acoustic signal to effect emission of acoustic waves that produce cavitation bubbles in the wetted area. A bottom surface of the slip plate serves as an acoustic diaphragm to impart cavitation bubbles at the wetted area interface. Optionally, a controller and/or status monitor may be provided to control and/or visual monitoring of power, acoustic frequency, intensity, duty cycle, or other parameters according to a condition of operation of the vessel or a condition of the water medium at the interface.

20 Claims, 8 Drawing Sheets

> US 8,893,634 B2

SELF-POWERED SLIP PLATE TO REDUCE SKIN-FRICTION DRAG ON A MARINE VESSEL

Cross-Reference To Related Application

This invention claims the benefit of U.S. Provisional Application Ser. No. 61/687,577 filed Apr. 27, 2012 in the name of the same inventor hereof and entitled "Self-Powered Slip Plate To Reduce Skin Friction Drag on a Marine Vessel."

BACKGROUND

The present invention concerns reducing skin friction drag at a wetted area of a hull of a marine vessel.

The improvement provided by the present invention provides, for example, a self-powered, bolt-on friction reduction apparatus that may be installed without need to interconnect the device the with vessel's power or control systems. The apparatus may be used as a retrofit for planing or semi-planing hulls of new and in-service marine vessels.

SUMMARY

According to the present invention, there is provided an anti-friction slip plate for attachment to a marine hull to reduce skin friction drag comprising an enclosure the houses acoustic components, an energy extraction mechanism to extract energy from the relative movement of water along the hull when underway, an electrical power generator driven by the energy extraction mechanism to provide a power source, an acoustic signal generator powered by the power source to produce an acoustic signal, and a series of transducers excited by the acoustic signal to generate acoustic waves having an intensity and frequency to produce microcavitation bubbles in the water medium.

Other features and aspects of the invention will become apparent upon review of the following description taken in connection with the accompanying drawings.

DESCRIPTION OF ILLUSTRATIVE EMBODIMENTS

Figure 1A:
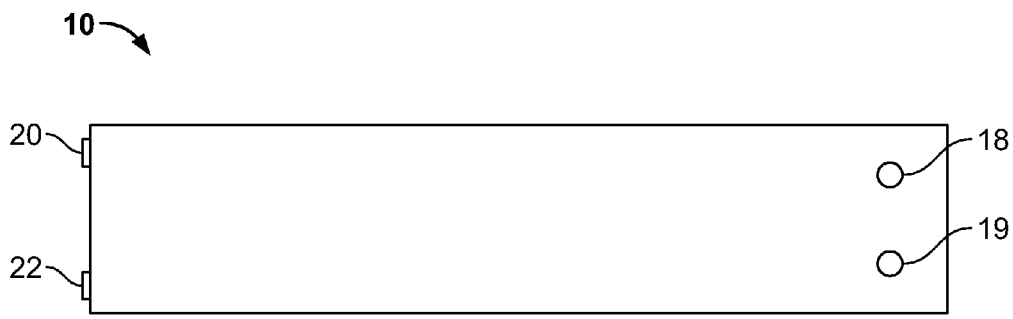
FIGS. 1A-1C respectively show top, bottom and side views of a slip plate according to the present invention.
Figure 1B:
Figure 1C:
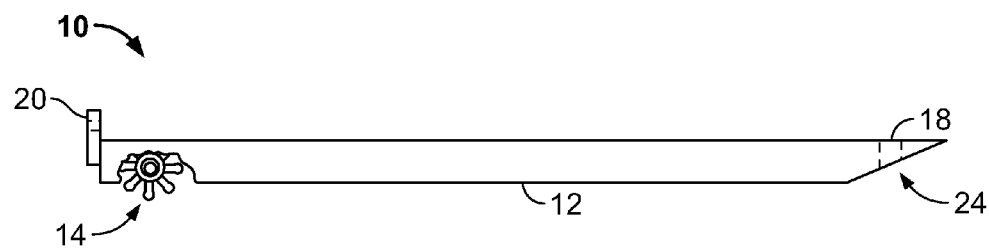

FIGS. 1A, 1B, and 1C respectively show top, bottom, and side views of a self-powered anti-friction slip plate according to the present invention. The slip plate is adapted for mounting on a wetted area of a hull of a marine vessel to help reduce skin friction drag when underway at sea. Slip plate 10 (or sonification plate as it is referred to in related application Ser. Nos. 12/312,879, 12/318,880, and 12/929,398, each or which is incorporated herein by reference) reduces drag on the vessel by acoustically generating cavitation bubbles at the water-hull interface as the vessel travels in displacement mode or on plane across a body of water. It is generally known in the art that cavitation bubbles produced by non-acoustic means and ranging in size between fifty and two hundred nanometers are most effective to reduce drag. Plate 10, however, acoustically generates microcavitation bubbles and comprises a substantially flat, low-profile stainless steel enclosure or housing to house acoustic components that produce such bubbles. Acoustic components are hermetically sealed within plate 10 and void spaces inside plate 10 may be filled with a non-conductive closed-cell form to electrically insulate electrical and electronic components and to prevent spread of water inside plate 10 in the event of a puncture of plate 10 during vessel operation. Materials or metals of plate 10 other than stainless steel may be employed to meet durability in a marine or salt water environment. Also, forward end 24 of plate 10 is beveled to help streamline water flow when the plate is attached to the hull.

Enclosure or plate 10 houses a series of ultrasonic transducers that emit ultrasonic waves into the water medium from a diaphragm generally defined by a lower surface 12 of the enclosure. Diaphragm 12 is integrally formed the bottom surface 12 of plate 10, but may be formed separately and attached to plate 10. The former, however, is preferred to reduce chance of water leakage into enclosure 12. Diaphragm properties of surface 12 depend on metal thickness, hardness, elasticity, and other parameters but a thickness of one-sixteenth to one-eight inch (1.5 to 3 mm) (e.g., within a thickness range of ten to sixteen gage) for 316 or 304 stainless steel is believed suitable. Twelve gage three sixteen stainless steel should be suitable. Moreover, enclosure 10 may include reinforcements therein to prevent collapse or compressively strengthen enclosure in the vertical direction, such as an internal honeycomb structure or web support structure or filler material.

In addition, enclosure or housing 10 includes an energy extraction mechanism preferably near an aft section thereof driven by water flow along the hull as the vessel increases speed in order to transfer kinetic energy to a generator, which may be of the permanent magnet type, such as a neodymium permanent magnet material. The energy extraction mechanism may be positioned at any location on plate 10 to extract energy from the relative movement or flow of water along or across plate 10 as vessel speed increases. In response to such movement, the acoustic signal generator, in turn, produces an acoustic signal to drive the transducers. As shown in FIG. 1C, energy extraction mechanism comprises a paddle wheel impeller 14 having vanes that protrude through opening 16 positioned in bottom surface 12. Vanes may comprise a rubber, polymer, metallic or any other flexible, hard or stiff material immune to erosion and fatigue failure, i.e., capable of suffering potential cavitation damage due to exposure to microcavitation bubbles generated by the slip plate 10. A relative water flow across surface 12 due to vessel speed of, for example, twenty to eighty knots, causes rotation of an impeller shaft which, in turn, rotates a shaft of the generator. A shaft connection between the impeller and generator may include a torque-limiting or constant torque coupling to prevent generator overdrive.

Instead of paddle wheel impeller 14, a helical impeller or other type of energy extraction mechanism may also be employed to effect rotation of the generator rotor. In addition, the acoustic signal generator may be located outside of enclosure 10 and driven by a fluid pump or hydraulic coupling with the energy extraction mechanism or impeller shaft. In response to water flow, the electrical generator rotates to produce electrical power that drives the acoustic signal generator to produce an acoustic signal that energizes the transducers which, in turn, produces acoustic waves having a frequency and intensity to nucleate cavitation bubbles at an interface between diaphragm 12 and the water medium as the vessel proceeds over water. Operating parameters of the electrical power generator (e.g., on-off, power level), acoustic signal generator (e.g., frequency, intensity, or duty cycle), and/or transducer (e.g., on-off, intensity, duty cycle, frequency) may be pre-set based on anticipated water conditions when these components are confined within hermetically sealed enclosure 10, or operating parameters of these component may be dynamically and automatically microprocessor-controlled according to sensed or measured vessel or water condition (speed, power level, ambient water temperature, or extent of cavitation or friction reduction) or manually by the vessel operator. Such control may be accomplished via a wired (e.g., electrical conductors), optical (e.g., fiber optic cable) or wireless (e.g., radio-frequency link) control channel or link in communication with any of the internal (or externally located) acoustic components of the slip plate.

In the illustrated embodiment, plate 10 is bolted at or near the aft section of the hull of a surface-planing marine vessel by way of eyelets 18, 19. Flanges 20, 22 secure plate 10 to the transom of the vessel. Dimensions of plate 10 may vary according to size of vessels to which they are attached but, by way of example, the width may generally range from one-half to two meters more or less, the length may generally range from two to six meters more or less, and a thickness of about five to ten centimeters more or less being defined by height of transducers and/or other internal components. The length of planing or semi-planing hull vessels utilizing the invention typically may range from eight to fifty meters although smaller and larger vessels may also be accommodated.

Figure 2A:
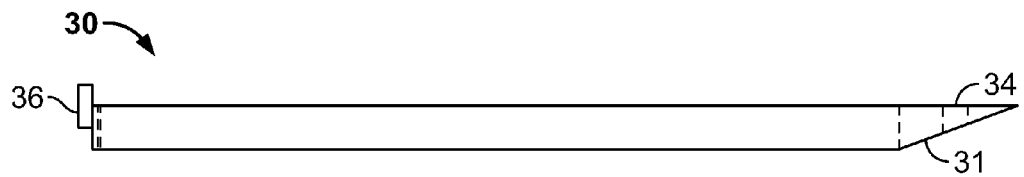
FIGS. 2A and 2B show top and side views of a frame for receiving a slip plate.
Figure 2B:
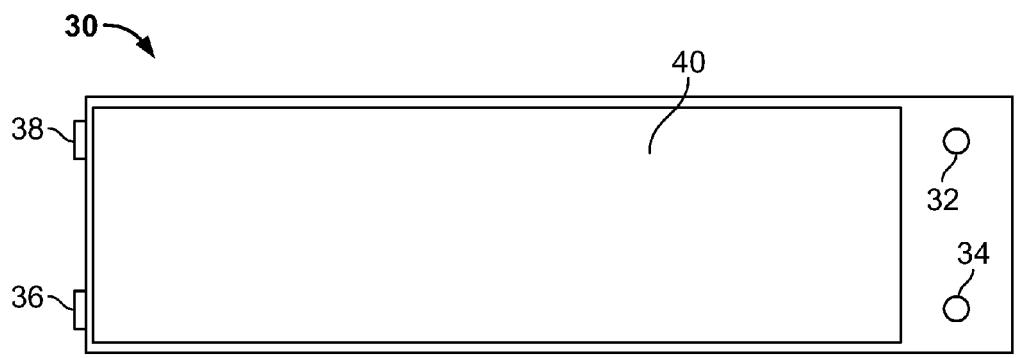
Figure 2C:
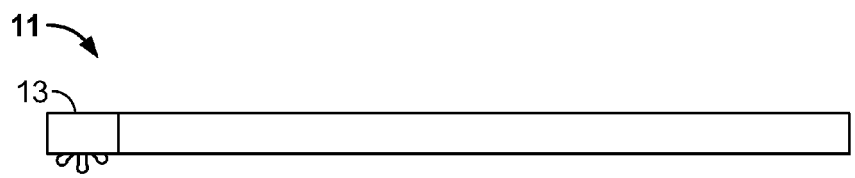
FIG. 2C shows a slip plate received by the frame of FIGS. 2A and 2B.

FIG. 2A (side view) and FIG. 2B (top view) show an alternative embodiment where a frame 30 supports a slip plate 11 (FIG. 2C) in operative arrangement with a vessel hull. Frame 30 has a beveled fore section 31 and is secured to the vessel hull via bolts fastened to the hull through eyelets 32, 34 as well as by securing flanges 36, 38 to the fore section of the hull as described in connection with plate 10 of FIGS. 1A-1C. Slip plate 11, which is more or less formed in the shape of a rectangular box, is then positioned and secured in opening 40 of frame 30. This way, plate 11 may conveniently be removed and/or replaced for repair. In addition, the aft section of plate 11 may comprise a separate compartment 13 for the impeller generator section so that it too may be separately removed and/or replace in case of repair needs.

Figure 3:
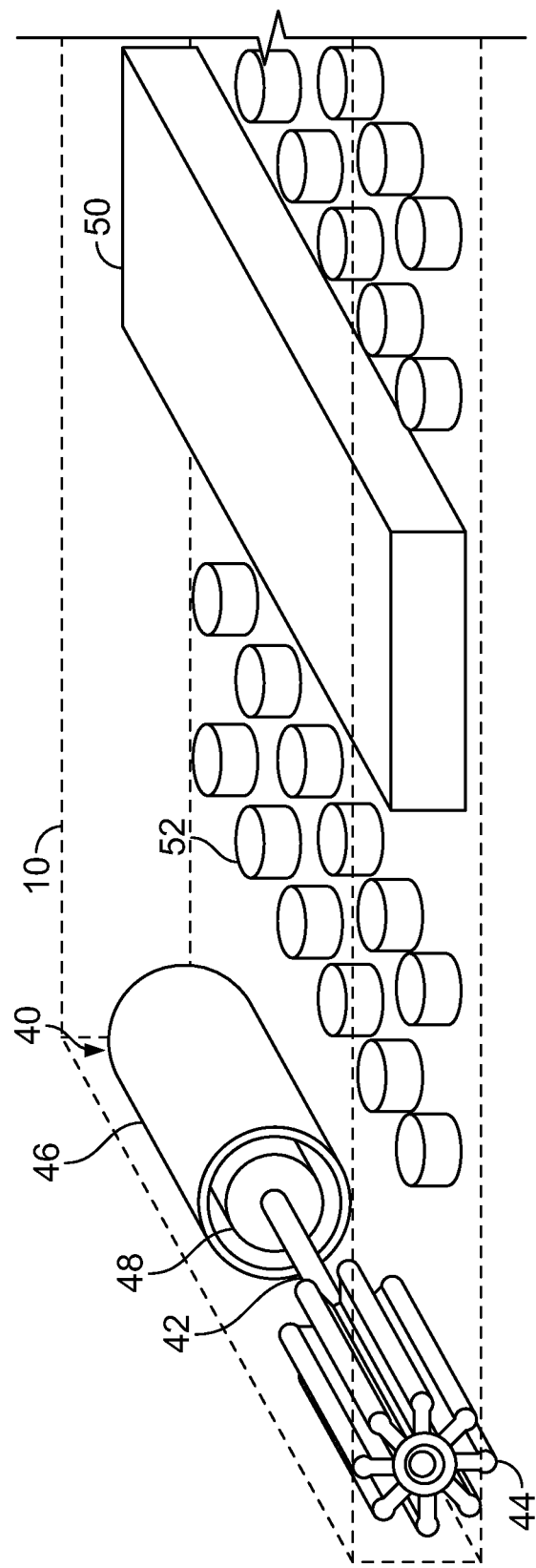
FIG. 3 is a perspective view of internal acoustic components of the slip plate of FIGS. 1A-1C or the slip plate of FIG. 2C.

FIG. 3 shows internal acoustic components of slip plate 10 of FIGS. 1A-1C, shown here in ghost format. In this embodiment, internal components include a permanent magnet power generator 40 driven by shaft 42 coupled to a paddle wheel impeller 44. When impeller rotates, shaft 42 also rotates rotor 48 of power generator which, in turn, induces current flow in coils (not shown) of stator 46 of generator 40. Electrical power produced by generator 40 is then supplied to acoustic signal generator 50 to produce acoustic signal that energizes a series of transducers 52 (only one identified here) to vibrate generally between twenty and one hundred kilohertz. Many types and shapes of commercially available transducers may be employed including piezoelectric transducers and mechanical vibrators that produce acoustic waves in the twenty to one hundred kilohertz range. Acoustic signal generator 50 may also include a current or voltage regulator, if necessary, to control power levels supplied thereto. As indicated above, power generator 40 and acoustic signal generator 50 may also reside outside enclosure 10 on board the vessel.

Figure 4A:
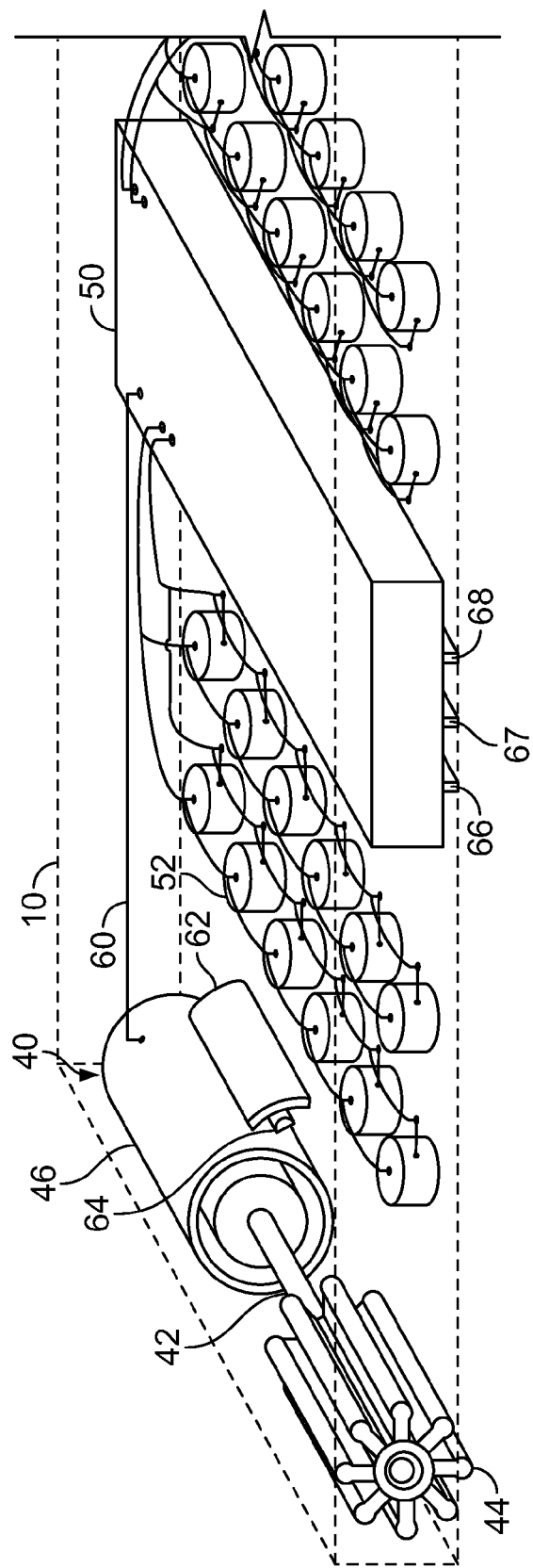
FIG. 4A shows further details of the internal acoustic components of FIG. 3 including power line connection between electrical power generator and acoustic signal generator, as well as cooling webs or fins to dissipate excess heat from the power generator and the acoustic signal generator.

To further explain, FIG. 4A show power line connection 60 between power generator 40 and acoustic signal generator 50, as well as a series of electrical circuit paths between transducers 52 and acoustic signal generator 50. Moreover, excess heat produced by stator 46 may be dissipated in the water medium through a thermally conductive path established by webs or fins 62, 64 thermally coupled between stator 46 and the bottom surface 12 (FIG. 1B) of plate 10. Similarly, excess heat produced in the acoustic generator 50 may be carried away by a series of webs or fins 66, 67, and 68 interconnecting the housing of the signal generator 50 (or heat sinks of internal electronic components) and the bottom surface 12 (FIG. 1B) of plate 10.

Figure 4B:
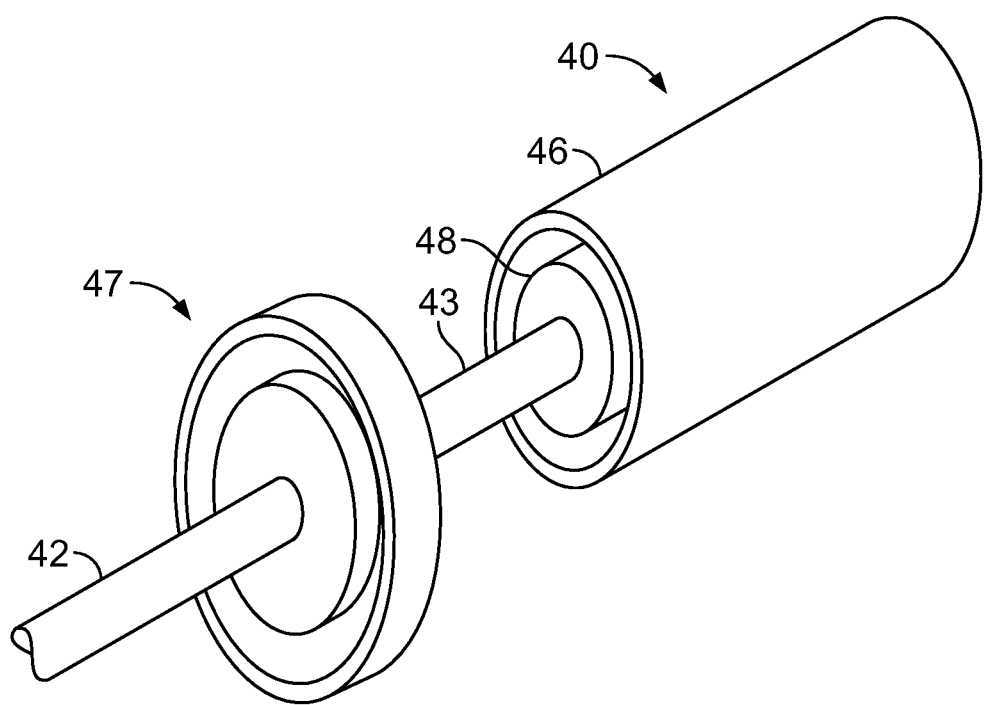
FIG. 4B shows a torque-limiting device interconnecting a shaft between the energy extracting mechanism and power generator of FIG. 4A.

FIG. 4B shows shaft 42 of impeller 44 (FIG. 4A) and shaft 43 of power generator 40 coupled through a torque-limiting or constant torque or constant speed coupling 47 to prevent generator overdrive. The shaft coupling 47 may comprise an electronically controlled or mechanically activated torque-limiting or overload clutch, or a mechanical friction clutch or magnetic slip-clutch as known in the art. Instead of providing a shaft coupling 47, torque on shaft 42 resulting from water flow may also be controlled by physical properties of the impeller vanes. For example, vanes of impeller 44 (e.g., composed of hard rubber or polymeric material) may have such elasticity or flexibility to flex, bend or deform according to a threshold pressure, speed or force generated by their contact with the water medium as the vessel's speed increases so that a constant torque or rotational speed is achieved upon reaching and beyond a certain vessel speed of, say fifteen or twenty knots more or less. This way, generator output remains fairly constant throughout much of the operational speed range of the vessel with imposing excess drag on the vessel due to opposing torque of the power generator. This same principle can be applied to helical vanes whether it rotational shaft is positioned perpendicular or parallel to the direction of water flow.

Figure 5:
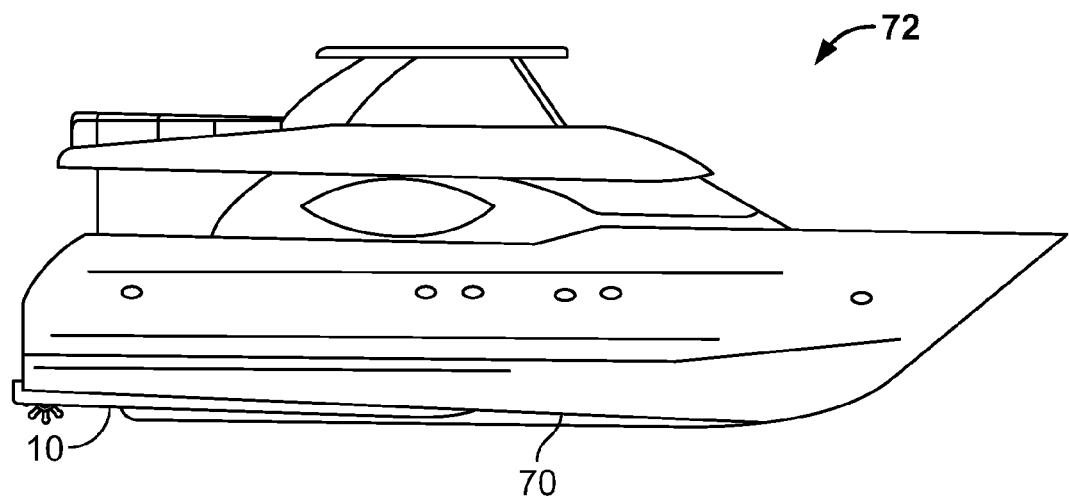
FIG. 5 shows how the slip plate may be positioned on the hull of a vessel.

FIG. 5 illustrates a typical installation of slip plate 10 at or near the aft section of a hull 70 of a planing hull vessel 72 so that, when the vessel planes on it aft section, skin friction drag is reduced.

Figure 6:
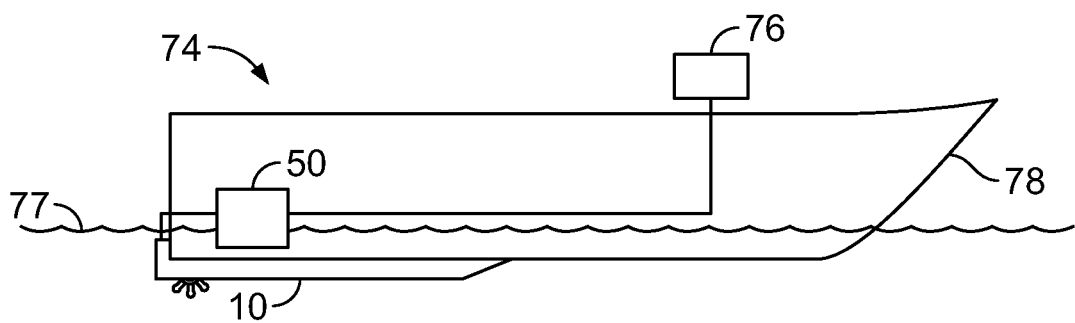
FIG. 6 shows an alternative embodiment of the invention where the acoustic signal generator is positioned on board the vessel and the vessel is provided with a controller and monitor to control and/or monitor power, acoustic or other parameters of vessel operation.

FIG. 6 shows an alternative embodiment where the acoustic signal generator 50 resides on board a vessel 74 that has a slip 10 attached to the aft section of hull 78 below water line 77. In addition, an on-board controller 76 is provided to control operational parameters of the acoustic signal generator 50 whether located inside or outside of the slip plate 10. In addition, the controller 76 may incorporate a status monitor to enable the vessel operator to visually observe and/or control power, transducer operation, acoustic waves, or other parameters including intensity, frequency and/or duty cycle of acoustic waves produced by the transducers.

Positioning acoustic generator 50 and/or the power generator 40 onboard the vessel advantageously permits redistribution of electrical power to acoustic signal generators among slip plates in a multi-plate arrangement or providing an alternative power supply from the vessel's onboard power supply system in the event of failure of generator 50.

Figure 7:
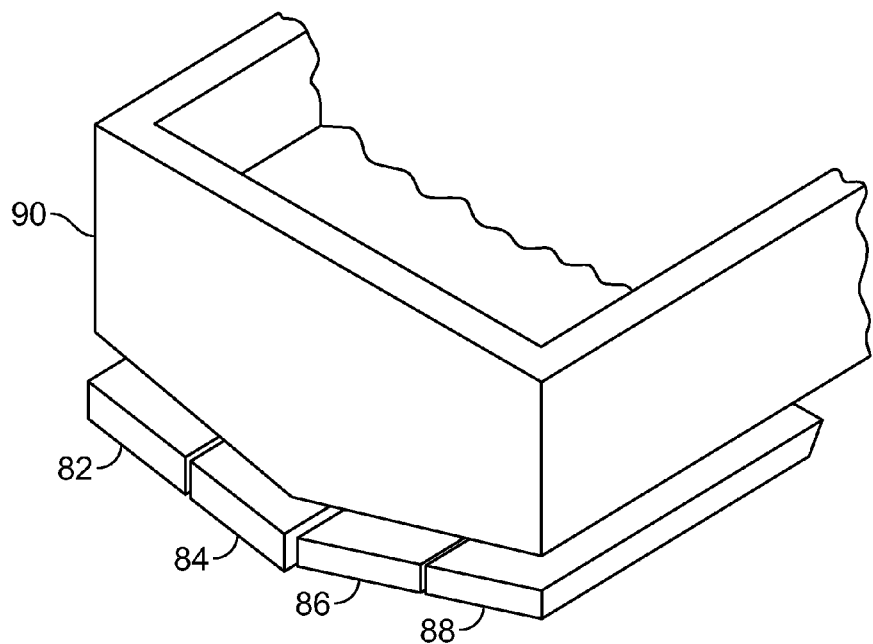
FIG. 7 shows a series of multiple slip plates in spaced relation with the aft section of a surface planing marine hull.

FIG. 7 shows multiple slip plates 82, 84, 86, and 88 in spaced-apart relation for abeam mounting at or near the aft section of hull 90 of a vessel. Due to the pattern of wetted area of the submersed hull when on plane, the outboard slip plates 82 and 88 are preferably shorter in the fore-aft direction than the inboard slip plates 84 and 86 in order to provide effective coverage of the wetted area. As indicated herein, the slip plates may vary in number, length and width to accommodate planing and semi-planing hull vessels from eight to fifty meters, generally, with longer slip plates being preferred for longer vessels and shorter slip plates being preferred for shorter vessels. Custom slip plates may also be configured for larger or smaller vessels of any length and beam width, or any hull shape near the transom or aft region. Advantageously, segmenting the slip plates in the abeam direction lessens impact of yaw instability in the event of a failure of one slip plate.

Variations and modifications may be made based on the above teachings and thus the invention is characterized by the appended claims rather than the illustrative embodiments set forth herein.

The invention claimed is:

1. A self-powered slip plate that mounts on a hull of a marine vessel to reduce skin friction drag by generating cavitation bubbles underneath the hull, said slip plate comprising:
   a substantially flat, low-profile enclosure to house acoustic components,
   a series of ultrasonic transducers disposed in said enclosure to generate acoustic waves from a diaphragm defined by a lower surface of said enclosure,
   an energy extraction mechanism driven by water flow along said hull due to speed of said vessel,
   a power generator responsive to said energy extraction mechanism to produce electrical power, and
   an ultrasonic signal generator responsive to said electrical power to generate an acoustic signal to energize said transducers to produce said acoustic waves of an intensity to nucleate cavitation bubbles at a water-diaphragm interface water as said vessel proceeds over water.

2. The slip plate of claim 1, wherein said energy extraction mechanism comprises an impeller having vanes that engage water to rotate said impeller in response to speed of said vessel over water.

3. The slip plate of claim 2, further comprising a shaft interconnecting said impeller and said power generator, said shaft including a torque-limiting clutch to limit the rotational speed of said power generator.

4. The slip plate of claim 3, wherein said impeller comprises a flexible rubber material.

5. The slip plate of claim 1, wherein said acoustic generator is disposed within and hermetically sealed inside said enclosure.

6. The slip plate of claim 5, further including an uninterrupted metallic thermal conduction path between at least one component of said acoustic generator and an outer portion of said enclosure to provide a heat sink path to dissipate heat produced by said generator.

7. The slip plate of claim 2, wherein said power generator comprises a rotor and stator disposed within said enclosure.

8. The slip plate of claim 5, wherein said power generator comprises a permanent magnet generator.

9. The slip plate of claim 1, further comprising a frame that mounts to the hull of the vessel, said frame having a receptacle to receive and secure said slip plate in operative relation with said hull.

10. The slip plate of claim 9, wherein said frame includes a tapered or bevel fore section to aid surface-planning of said vessel.

11. The invention of claim 1, further including a controller on board said vessel that communicates with components of said slip plate to enable a vessel operator to control acoustic waves produced by said transducers.

12. The invention of claim 11, further including a status monitor on board said vessel to enable the vessel operator to visually monitor said power, transducer operation, or acoustic waves.

13. The invention of claim 12 comprising multiple slip plates for mounting abeam on a vessel hull wherein said controller and said status monitor provide control and monitoring of power, transducer operation, or acoustic waves of each said slip plate.

14. The invention of claim 11, wherein said controller enables control of intensity, frequency and/or duty cycle of acoustic waves produced by said transducers in accordance with a condition of operation of said vessel.

15. The invention of claim 1, wherein said enclosure includes reinforcement therein to prevent collapse or to compressively strengthen enclosure in the vertical direction, which reinforcement may include an internal honeycomb structure or web support structure or non-conductive filler material.

16. The invention of claim 1, further including a closed cell foam material to fill a void space inside the enclosure.

17. The invention of claim 1, further comprising a thermal conduction path including metallic webs interconnecting the stator of said power generator and an outer portion of said enclosure to provide cooling of said generator.

18. The invention of claim 1, wherein said enclosure comprises modular sections to provide separable but interconnected compartments for at least one of said energy extraction mechanism, said ultrasonic signal generator, and said transducers whereby to enable replacement and repair individually.

19. The invention of claim 2, wherein physical properties of vanes of said energy extraction mechanism substantially define rotational speed or torque applied to said power generator according to a speed threshold of the vessel.

20. An anti-friction slip plate for attachment to a marine hull to reduce skin friction drag comprising an enclosure the houses acoustic components, an energy extraction mechanism to extract energy from the relative movement of water along the hull of the vessel when underway, an electrical power generator driven by the energy extraction mechanism to provide a power source, an acoustic signal generator powered by the power source to produce an acoustic signal, and a series of transducers excited by the acoustic signal to acoustically generate acoustic waves having an intensity and frequency to produce microcavitation bubbles at an interface between the slip plate and water.

\* \* \* \* \*